United States Patent [19]

Connolly et al.

[11] 4,289,930
[45] Sep. 15, 1981

[54] ELECTRONIC APPARATUS FOR THE DISPLAY OF INFORMATION RECEIVED OVER A LINE

[75] Inventors: David C. A. Connolly, Hong Kong, Hong Kong; Harry Shutt, Darlington, England

[73] Assignee: The General Electric Company Limited, London, England

[21] Appl. No.: 965,041

[22] Filed: Nov. 30, 1978

[51] Int. Cl.³ .......................................... H04M 11/08
[52] U.S. Cl. .............................. 179/2 TV; 179/2 DP
[58] Field of Search .................. 179/2 R, 2 DP, 2 TV

[56] References Cited

U.S. PATENT DOCUMENTS

| | | | |
|---|---|---|---|
| 3,822,363 | 7/1974 | Moyer et al. | 179/2 TV |
| 3,976,840 | 8/1976 | Cleveland et al. | 179/2 DP |
| 4,150,254 | 4/1979 | Schussler et al. | 179/2 DP |

Primary Examiner—Joseph A. Popek
Attorney, Agent, or Firm—Kirschstein, Kirschstein, Ottinger & Cobrin

[57] ABSTRACT

Apparatus for connection over a telephone line to a remote data bank has provision for displaying a 'page' of information received in digital form from the data bank in response to a request for that page being signalled by the apparatus to the data bank identifying the required 'page'. To enable the apparatus to be connected to a particular data bank and to signal the identity of a required 'page', the apparatus has a keyboard for operation by the user. Furthermore the apparatus has an electrically-alterable memory for storing the telephone number of several remote data banks and the identity of frequently required 'pages', the information stored by this memory being accessed and utilized by operation of the keyboard on a "short-code" signalling basis.

5 Claims, 2 Drawing Figures

ELECTRONIC APPARATUS FOR THE DISPLAY OF INFORMATION RECEIVED OVER A LINE

BACKGROUND OF THE INVENTION

This invention relates to electronic apparatus for the display of information received over a line.

More particularly, but not exclusively, the invention is concerned with apparatus for a user terminal of the VIEWDATA system proposed by the British Post Office.

SUMMARY OF THE INVENTION

According to the present invention, electronic terminal apparatus for the display of information received in digital form over a line has provision for transmitting electrical signals to line in digital form in respect of information stored by a semiconductor memory, said memory being of the kind which enables information stored thereby to be altered electrically by the user and/or from a remote location.

With the VIEWDATA system, it is necessary when a connection has been set up between a user terminal and a remote data bank for the terminal apparatus to supply information as to the identity of the terminal so that the terminal can be charged for the duration of the connection at the appropriate tariff. In apparatus in accordance with the invention, this information may be stored by the memory and may be written in on initial installation of the apparatus.

Said memory may be of a non-volatile type, that is to say, one in which the information thereby is retained when the apparatus is not powered. For example, this memory may be of the kind utilising nitride-metal-oxide semiconductor technology (NMOS). Alternatively the memory may be of a volatile type in which the information stored thereby is only retained for as long as the apparatus is powered. In this case, if the apparatus is arranged, when in use, to be supplied with electric power from the mains, the apparatus may have a rechargeable battery which is arranged to be charged from the mains and which supplies power to re-generate the information stored by the memory (which may, for example, utilise complimentary metal-oxide semiconductor technology (CMOS)).

One example of terminal apparatus in accordance with the present invention and for use primarily with the VIEWDATA system will now be described with reference to the two figures of the accompanying drawings in which

DESCRIPTION OF THE PREFERRED EMBODIMENT

Figure 1:
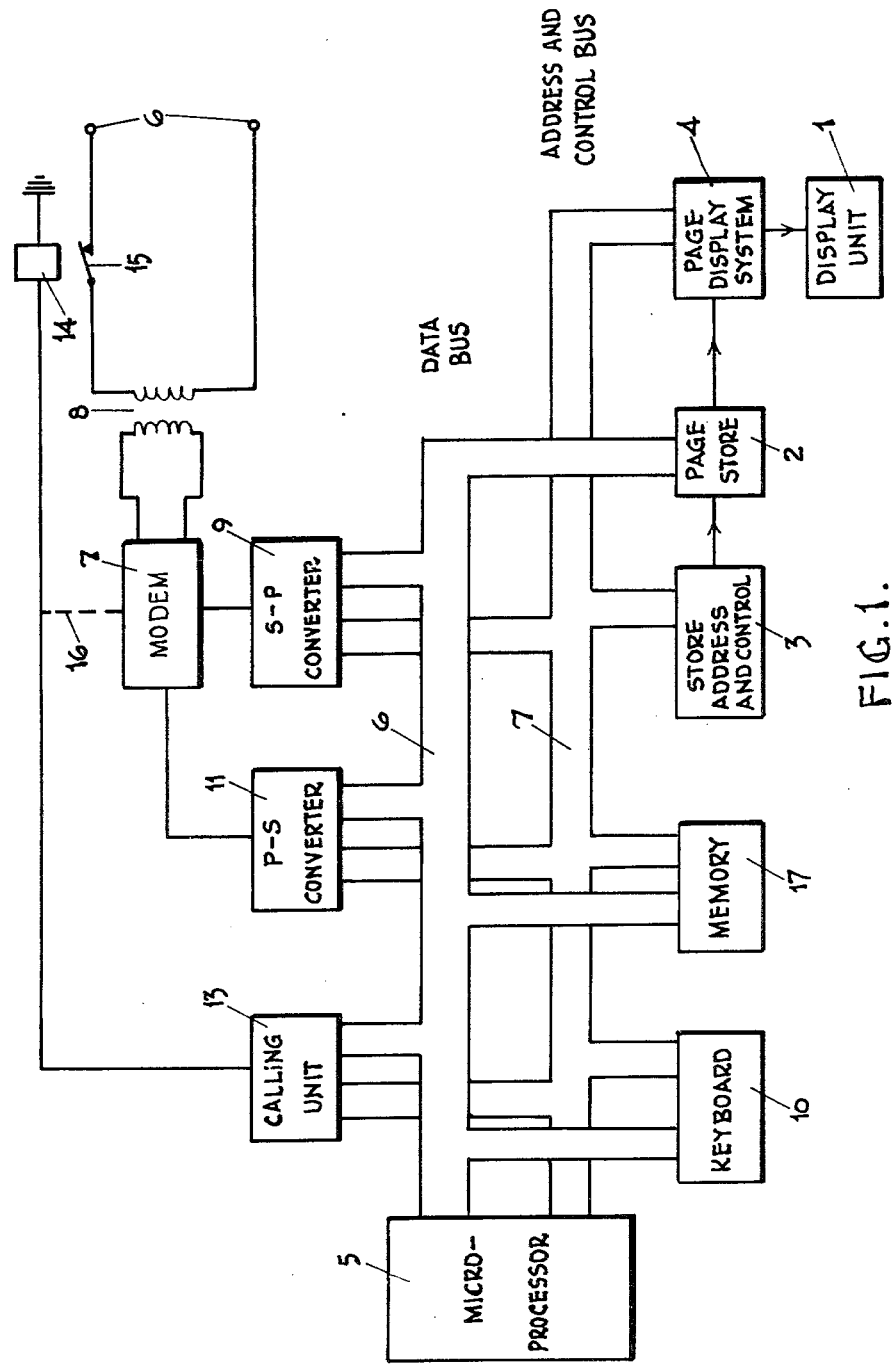
FIG. 1 shows the complete terminal apparatus diagrammatically.

Referring to FIG. 1 of the accompanying drawings, the terminal apparatus comprises a display unit 1 having a cathode ray tube (not shown) on the screen of which appears the "page" of information to be displayed at any time utilising conventional line and frame scanning. The items of information making up a page to be displayed are stored in binary coded form in a page store 2 and items are read from this memory in synchronism with the line and frame scanning of the cathode ray tube under the control of a store address and control unit 3. A page display system 4 has a character generator read-only memory (not shown) which converts information read from the page store 2 into the required monochrome video signal (or individual colour signals if the apparatus gives a colour display) for controlling the cathode ray tube. The page store 2, the store address and control unit 3 and the page display system 4 together with other items (as will hereinafter be described) are connected to a microprocessor 5 by way of a common data highway or bus 6 (consisting of seven separate conductors) and a common address and control highway or bus 7 (consisting of eleven address conductors and five control conductors). The microprocessor 5, which may conveniently be an INTEL 8085, is programmed to control the operation of the remainder of the terminal apparatus and, for example, controls the writing of information to be displayed into the page store 2 and the reading of information from the store. As so far described, the terminal apparatus under consideration is already known and operates generally in the manner described in the complete specification of our U.K. patent application No. 36842/76.

The page store 2, the store and address control circuit 3 and the page display system 4 may respectively be formed by integrated circuits type MA414 (two off), MA401 and MA400 all supplied by GEC Semiconductors Ltd.

Bidirectional data signalling between the terminal apparatus and a remote location (at which there is a data bank capable of supplying binary data in respect of pages of information to be displayed in response to a request identifying the required page in binary form) is by means of a telephone line (not shown) connected to a pair of terminals 6. Signalling in both directions utilises the frequency shift keying (FSK) form of modulation, information from the remote location being signalled at a date rate of 1200 bits per second while information sent in the opposite direction for requesting a page is signalled at a lower data rate of 75 bits per second.

A modem 7 is connected to the terminals 6 by way of a transformer 8 and is arranged to handle signalling in both directions. When signalling a page of information to be displayed, the modem 7 supplies a binary signal carrying the required data in serial form to a serial-to-parellel converter 9 which, under the control of the microprocessor 5, in turn supplies in parallel signals representing the eight bits characterising each item of information to be displayed (for example an alpha-numeric character) to the microprocessor 5 via the conductors of the data bus 6. The microprocessor then passes on those again via the data bus 6, to page store 2 which is arranged to store each item of information for subsequent display.

It may be mentioned here that the microprocessor 5 periodically interogates the various other units connected to the buses 6 and 7 via the address and control bus 7 and, whenever such a unit indicates that it has data for transfer to another unit, transfer is effected under the control of the microprocessor 5 by first passing the data from the first unit to the microprocessor and then rerouting that information to the second unit (as identified by address signals on the bus 7), in both cases the appropriate data signals being passed in parallel over the data bus 6.

A request for a particular page of information to be displayed may be signalled to the remote data bank by operation of a numeric or alpha-numeric keyboard 10 at the terminal under consideration. Upon each operation of a key of the keyboard 10, binary signals representing the selected character to be signalled are passed in parallel via the data bus 6 and the microprocessor 5 to a parallel-to-series converter 11 which supplies a serial binary signal characterising the character to the modem 7 for onward transmission.

When it is required to access the remote data bank for the purpose of displaying information, it is first necessary for the terminal apparatus to be connected through the telephone network to the data bank. For this purpose the terminal apparatus must transmit to the telephone line signals (either in the form of "dial" impulses or multi-frequency tones) carrying the telephone number of the data bank. In the example of terminal apparatus being described, this is achieved by means of a calling unit 13 in response to operation of numeric keys of the keyboard 9. Thus, upon each operation of such a key, binary signals representing the selected key are passed to the calling unit 13 which is then controlled by the microprocessor 5 to cause the required succession of signals to be applied to the telephone line connected to the terminals 6. If the telephone network responds to impulse type signals, the necessary loop disconnect impulses are obtained by operation of a relay 14 which opens and closes contacts 15 in circuit between the terminals 6 as shown in the drawing. Alternatively, if the telephone network responds to multi-frequency signals, the relay 14 is not needed and the calling unit 13 supplies the appropriate tone signals (via the path shown by a broken line 16) into the audio output circuit of the modem 7.

Upon the connection through the telephone network to the remote data bank being set up, the data bank sends back a signal to the calling terminal requesting that terminal to identify itself for charging purposes. The identity of the terminal is stored by a memory 17 as a multi-decimal-digit number (or other combination of alpha-numeric characters). When the terminal is required to identify itself, each decimal digit (or other character) is automatically read in turn from the memory 17 under the control of the microprocessor 5 and is passed via the data bus 6 and the converter 11 to the modem 7 which causes the decimal digit value (or character) to be signalled over the telephone line to the remote data bank.

The memory 17 is a volatile semi-conductor memory of the electrically alterable random access type. Such a memory is sometimes known as a read-mostly-memory (RMM) or as an electrically alterable programmable read only memory (EAPROM). When the apparatus is first installed at the terminal in question, the identity of the terminal is written in to the memory 17. This may be achieved under the control of the microprocessor 5 by operation of the keyboard 10. Preferably, however, at least part of the terminal identification (as stored by the memory 17) is obtained by establishing a connection from the terminal apparatus to apparatus at a remote location, transmitting signals to the location to request terminal identification by the user operating a predetermined sequence of keys of the keyboard 10, and recording in the memory 17 the terminal identification sent back from the remote location, all these operations at the terminal being performed under the control of the microprocessor 5.

The apparatus has provision for the memory 17 to be powered (either from the mains or from a rechargeable battery as hereinbefore discussed) when the apparatus is not actually in use so as to enable the information written into the memory to be retained. It will, of course, be appreciated that new terminal identification information has to be written into the memory 17 if the apparatus is moved to another terminal of the Viewdata system.

Figure 2:
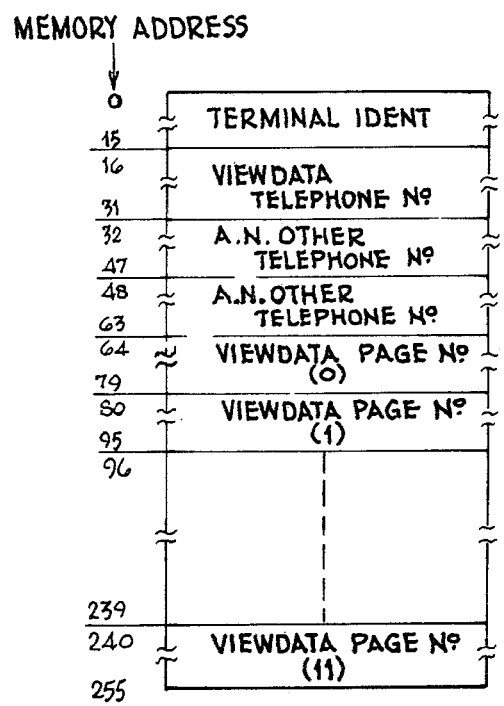
FIG. 2 shows a typical arrangement of information stored by the memory of the terminal apparatus of FIG. 1.

The electrically alterable memory 17 is also used to store information other than the identity of the terminal which may be called up and signalled to line on a "shortcode dialling" basis by the user of the terminal apparatus operating one or a few keys of the keyboard 10. The other information stored by the memory 17 includes the telephone numbers of the Viewdata and other remote data banks to which access is required from time to time (thereby avoiding having to use the keyboard 10 in the manner previously described every time such access is required) and the identity of pages of information (e.g. the "Financial" page and the "Weather" page) which are frequently requested for display. To provide these facilities, the memory 17 is a 256×4 bit store, the storage being divided into sixteen segments in which are respectively stored the terminal identification, three telephone numbers and twelve Viewdata page numbers as shown in FIG. 2 of the accompanying drawings, each segment having provision to store up to sixteen decimal digits in binary coded form.

The keyboard 10 has four named keys (not shown) marked "VIEWDATA", "PROGRAM", "PAGE TRANSMIT", and "CLEAR" and two further keys (marked respectively with an asterisk and a hash symbol) in addition to the numeric keys previously mentioned. Upon each of these keys being pressed, signals representing a unique eight bit code are generated and passed in parallel to the microprocessor 5 via the bus 7. The manner in which the microprocessor 5 responds to the four named keys will now be described.

When the VIEWDATA key is pressed, the telephone line connected to the terminal apparatus under consideration is seized (by looping the line as when a conventional telephone instrument goes "off-hook") and the microprocessor 5 commences to time a five second period. If, before the end of that period, the user presses one of the keys "0", "1", or "2", the appropriate one of the three telephone numbers stored by the memory 17 is read from that memory and passed to the calling unit 13 for use as previously described. If, however, no such key is pressed before the end of the five second time-out, it is assumed that the user wishes to be connected to the Viewdata bank and the microprocessor 5 causes the relevant number to be passed from the memory 17 to the calling unit 13.

To write the telephone number of a remote data bank into the memory 17, the key PROGRAM is pressed and this is followed by pressing the appropriate one of the keys "0", "1" and "2" (to identify the segment within the memory 17 in which the telephone number is to be stored) and then the numeric keys in respect of the required telephone number which may have up to sixteen decimal digits. At the end of this sequence the 'hash' key is pressed to signify to the microprocessor 5 that instructions for writing a telephone number into the appropriate segment of the memory 17 has been completed whereupon the desired operation takes place.

For the purpose of writing a page number into the memory 17, the sequence is to press the key PROGRAM, the 'asterisk' key of the keyboard 10 and one or more keys in respect of a number in the range "0" to "11" (to identify the segment of the memory 17 in which the page number is to be stored). This is followed by again pressing the 'asterisk' key (to signify that the segment identification has been completed) and a plurality of further numeric keys of the keyboard 10 in respect of the relevant page number. Finally the 'hash' key is pressed to signify that the entry has been completed.

Alternatively the number of a page of information which is currently displayed by the display unit 1 may be stored by the memory 17 for easy recall of that page at a later time. In this connection it will be appreciated that the VIEWDATA system as presently envisaged is such that the first line of each displayed page contains the page number at twelve predetermined character positions so that, with the apparatus under consideration, the page number (of up to twelve decimal digits) of a displayed page is stored at the appropriate storage locations within the page store 2. The microprocessor 5 may be instructed to write the number stored at those locations of the store 2 into the memory 17 by pressing the PROGRAM key followed by the 'hash' key and the numeric key (or keys) identifying the appropriate segment of the memory 17 as before. The sequence is completed by again pressing the 'hash' key.

When the user wishes to call up for display a page the full number of which is stored by the memory 17, it is merely necessary for him (after establishing connection to the remote data bank) to press the PAGE TRANSMIT key followed by the key (or keys) of the "short code" number (in the range "0" to "11") identifying the segment of the memory in which the page number is stored and the 'hash' key. Upon this occurring, the microprocessor 5 reads the page number from the memory 17 and causes signals characterising the required page number to be transmitted to line via the converter 11 and the modem 7.

To clear down a call established to a remote data bank, the key CLEAR is pressed.

Although not shown in the drawings, the terminal apparatus may also have a card reader connected to the data bus 6 and to the address and control bus 7. This card reader may be used for entering information, for example into the memory 17, in place of the keyboard 10.

We claim:

1. Electronic apparatus for the display of pages of information signalled from a remote location in response to a request for the information being signalled by the apparatus to the remote location, the apparatus comprising:
 (A) a pair of terminals for connection to a transmission line,
 (B) a raster-type display unit responsive to video signals for controlling the display thereof,
 (C) a data store for storing data representing in digitally-coded form characters to be displayed by the display unit,
 (D) means to write character identifying data into the data store in response to signals which are applied to the pair of terminals and which carry the data,
 (E) video signal generating means to derive said video signal from the data stored by the data store for supply to the display unit,
 (F) a keyboard,
 (G) an electrically-alterable memory,
 (H) means to enter into the memory in response to operation of the keyboard, data identifying selected pages of information which are to be transmitted from the remote location, and
 (I) means responsive to further operation of the keyboard to supply to the pair of terminals for transmission to the remote location signals characterizing at least some of the data stored by the memory and identifying a particular one of the selected pages of information.

2. Apparatus according to claim 1 wherein a part of the data stored in the memory is in respect of the identity of the apparatus and means is provided responsive to signals received at the pair of terminals from the remote location to transmit signals to the terminals for transmission to the remote location relating to that identity as stored by the memory.

3. Apparatus according to claim 2 wherein means is also provided to enable data to be written into the memory in response to signals received at the pair of terminals from the remote location.

4. Apparatus according to claim 1 wherein part of said data written into the memory is in respect of the identity of a remote terminal to which the apparatus is required to be connected during use and means is provided responsive to operation of the keyboard to supply signals to the terminals characterizing that identity as stored by the memory.

5. Apparatus according to claim 4 wherein there is provided means responsive to operation of the keyboard to write the data in respect of the identity of the remote terminal into the memory.

* * * * *